R. Lawson.

Turning Ovals.

Nº 97,096.  Patented Nov. 23, 1869.

Witnesses
A. W. Almqvist
O. Hinchman

Inventor
R. Lawson
per Munn & Co
Att'ys

United States Patent Office.

RAMSEY LAWSON, OF SHELBURNE FALLS, MASSACHUSETTS.

Letters Patent No. 97,096, dated November 23, 1869.

IMPROVEMENT IN LATHE FOR TURNING OVALS.

The Schedule referred to in these Letters Patent and making part of the same.

To all whom it may concern:

Be it known that I, RAMSEY LAWSON, of Shelburne Falls, in the county of Franklin, and State of Massachusetts, have invented a new and improved Lathe-Attachment for Turning Ovals; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object, to furnish an improved device for attachment to lathes, by means of which oval handles for tools and other oval work may be turned with the same ease and rapidity as round work; and It consists in the construction and combination of the various parts of the device, as hereinafter more fully described.

A is the centre, which is so formed as to take hold of the material to be turned, in such a way that the said material to be turned may carry the said centre with it in its revolution.

Figure 1:
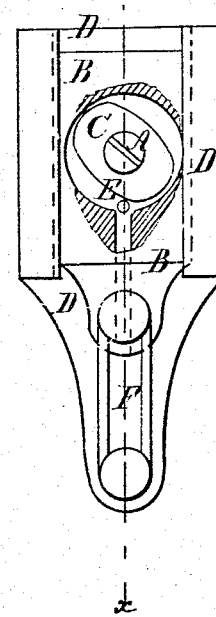
Figure 1 is a face view of my improved device, part of the sliding plate being broken away to show the construction.
Figure 2:
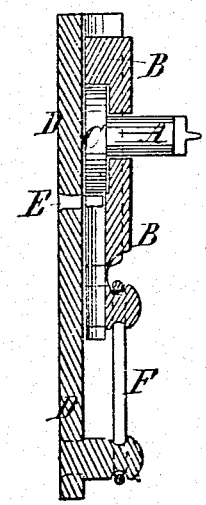
Figure 2 is a detail sectional view of the same, taken through the line $x\ x$, fig. 1.

The centre A passes through a hole in the plate B, and has an oval plate, C, formed solidly upon or rigidly attached to its inner end, as shown in figs. 1 and 2.

The oval plate C revolves in a circular recess formed in the inner side of the plate B, for its reception, so that the said plate B may lie smoothly upon the surface of the plate D, in a dovetailed groove in the face of which, the said plate B works.

E is a pin rigidly attached to the plate D, in such a position as to enter the recess in the inner side of the plate B, so that the edge of the oval plate C may bear against it.

The plate B is drawn forward to hold the oval plate C closely against the pin E, by a rubber or equivalent spring, F, attached to the said plates B and D.

By this construction, as the centre is revolved by the material to be turned, the edge of the oval plate C, pressing against the pin E, causes the said centre, and with it the plate B, to move back and forth upon the plate D, the length of said movement depending upon the relative lengths of the longer and shorter axes of the oval plate C.

To turn ovals of different forms, different centres A, and different oval plates C, must be used.

To enable the plate B to be removed for the convenient changing of the said centres and oval plates, the under side of the plate B is grooved from the recess in which the oval plate C revolves, to its outer edge, toward the spring F, for the passage of the pin E, so that when the spring F is disconnected from the plate B, the said plate may be easily slid out and removed from the plate D. By this construction, the part of the material nearest to the centre A, will be most oval, and the part of the material turned near the other centre of the lathe will be very nearly circular.

To turn the material to the same oval throughout its entire length, a similar attachment must be connected with the other centre of the lathe, in such a way that both ends of the said material may have the same backward-and-forward movement while being revolved.

Having thus described my invention,

What I claim as new, and desire to secure by Letters Patent, is—

An improved attachment for lathes, formed by the combination of the centre A, recessed and grooved sliding plate B, oval plate C, grooved plate D, pin E, and rubber or equivalent spring F, with each other, substantially as herein shown and described, and for the purpose set forth.

RAMSEY LAWSON.

Witnesses:
ARTHUR MAXWELL,
WILLIS L. BROWN.